United States Patent Office 3,119,796
Patented Jan. 28, 1964

3,119,796
MONOMERS, POLYMERS, AND COPOLYMERS OF VINYL ACYL PINOLATES
Barnard A. Parkin, Jr., and Glen W. Hedrick, Lake City, Fla., assignors to the United States of America as represented by the Secretary of Agriculture
No Drawing. Filed Mar. 24, 1960, Ser. No. 17,441
12 Claims. (Cl. 260—87.1)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to acyl, ethenyl esters of pinolic acid, methods for producing the same, and to certain polymeric derivatives thereof. More particularly, the invention relates to acylated pinolic acids, vinyl acyl pinolates derivable therefrom, vinyl pinolate, and polymers made from these vinyl esters.

A primary object of the present invention is to provide new acyl pinolic acids. Another object of the invention is to provide methods for preparaing vinyl pinolate and novel vinyl acyl pinolates having utility in the production of polymers. Other objects are to provide homopolymers of vinyl pinolate and of vinyl acyl pinolates, and copolymers of these vinyl esters with vinyl chloride.

The acyl pinolic acids of the present invention can be produced either by reacting pinolic acid (i.e., 3-(1-hydroxyethyl)-2,2-dimethyl-cyclobutaneacetic acid) with the appropriate anhydride, or by reacting pinolic acid with the appropriate alkyl monocarboxylic acid in the presence of an acid catalyst. Suitable anhydride reactants include acetic anhydride, propionic anhydride, butyric anhydride, and the like. Suitable alkyl monocarboxylic acid reactants include acetic acid, propionic acid, butyric acid, and the like.

In acylating pinolic acid with the appropriate anhydride according to the present invention, it is generally preferred to employ slightly more than two moles of anhydride for each mole of pinolic acid being acylated. The preferred procedure is to dissolve the pinolic acid in the desired alkyl monocarboxylic acid, and add this solution slowly with stirring to a mixture of the anhydride of the alkyl monocarboxylic acid and an approximately equal volume of the alkyl monocarboxylic acid heated at reflux temperature. The reaction mixture is refluxed until the alcoholic hydroxyl group of the pinolic acid is substantially completely acylated. At the end of the reaction period, water is added and the alkyl monocarboxylic acid is removed by vacuum distillation. The acyl pinolic acid product is then purified by vacuum distillation in the conventional manner.

When it is desired to acylate pinolic acid by direct reaction with an alkyl monocarboxylic acid according to the present invention, an acid catalyst is employed. The preferred catalyst is p-toluene sulfonic acid. In the preferred procedure, the pinolic acid is dissolved in an unreactive organic solvent such as chloroform, and this solution is added slowly to a refluxed solution consisting of a stoichiometric excess of the alkyl monocarboxylic acid, the p-toluenesulfonic acid catalyst, and sufficient additional organic solvent to give a homogeneous solution. The reaction mixture is heated at the reflux temperature, with azeotropic removal of the water formed, until the acylation of the pinolic acid is substantially complete. Following completion of the reaction, the acyl pinolic acid product can be readily isolated and purified using conventional methods. The preferred procedure is to wash the cooled reaction mixture with water, extract the wash with chloroform, combine the chloroform extract with the main chloroform solution, remove the solvent by vacuum distillation, wash the residue with water to remove residual acid, and then vacuum distill the residue to produce the purified acyl pinolic acid.

The acylated pinolic acids can be vinylated according to the present invention to produce the corresponding vinyl acyl pinolates. The preferred method is to vinylate the acyl pinolic acid with a large stoichiometric excess of vinyl acetate in the presence of a mercury salt of a strong acid as catalyst, using a conventional vinyl interchange procedure. It is generally preferred to employ about 12 moles of vinyl acetate per mole of acyl pinolic acid and to carry out the vinylation at about room temperature. After the vinylation reaction is completed, the excess vinyl acetate is preferably removed by distillation under reduced pressure at relatively low temperature, and the residue washed with water and then saturated aqueous sodium bicarbonate solution to remove any unreacted materials. The washed residue is dried and vacuum distilled in the conventional manner to produce the pure vinyl acyl pinolate.

Pinolic acid can also be vinylated by the above described vinyl interchange procedure to produce vinyl pinolate. In this case, the reaction mixture is preferably maintained at about 0° C. during and after incorporation of the mercury catalyst system in order to avoid formation of the vinylidene compound at the hydroxyl group. Because of the lower reaction temperature, a longer reaction time is required.

The vinyl acyl pinolates and vinyl pinolate of this invention, upon catlytic reduction of the vinyl group using a catalyst such as palladium on carbon, yield the corresponding ethyl acyl pinolate and ethyl pinolate, respectively. These ethyl esters are identical with the corresponding ethyl esters which can be produced by direct esterification of the acyl pinolic acids or pinolic acid with ethyl alcohol in the presence of p-toluenesulfonic acid catalyst, removing water formed in the esterification reaction by azeotropic distillation. In addition to the ethyl esters, other esters such as the propyl, alkyl, and the like esters of the acids can also be produced by this same direct esterification procedure, as will be readily apparent to those skilled in the art.

The vinyl acyl pinolates and vinyl pinolate of the present invention have utility in the production of various types of polymers. These vinyl esters can be homopolymerized readily to yield a variety of homopolymers, varying widely in physical characteristics, molecular size, and solubility. Homopolymers of vinyl pinolate possessing unreacted hydroxyl groups can be further reacted with organic polyisocyanates, such as toluene diisocyanate and the like, to produce novel polymers. The vinyl esters of this invention copolymerize readily with vinyl chloride to yield copolymers of a variety of compositions. These copolymers can be processed at lower processing temperatures than those required for processing the conventional poly (vinyl chloride-vinyl acetate) copolymers.

The following examples are given by way of illustration and not by way of limitation of the invention.

EXAMPLE 1

Cis-d,l-pinolic acid.—Crystalline, cis-d,l-pinonic acid (736 g., 4 moles) was dissolved in excess alkali (200 g., 5 moles of NaOH in 1200 ml. water) and the solution was made up to 2 l. with water. The solution was hydrogenated in a rocking autoclave in the presence of platinum oxide (1.4 g.) at 1500–1800 p.s.i.g. hydrogen pressure. Hydrogen absorption was rapid during most of the run but the last mole was absorbed very slowly. After hydrogen absorption ceased (about one week) the mixture was filtered and the solution acidified by slow dropwise addition of concentrated sulfuric acid. The mixture was filtered, and the crystalline pinolic acid was washed free of sulfuric acid with water and then air dried. The crude air-dried crystals, M.P. 91°–96° C., contained some oil, probably trans-pinolic acid. The crude product, after recrystallization from water or ether-petroleum ether mixtures, yielded a purified cis-$d,l$-pinolic acid, M.P. 100–101° C.

EXAMPLE 2

*Cis-d,l-pinolic acid acetate, by anhydride method.*—A solution of the cis-$d,l$-pinolic acid (46.5 g., 0.25 mole) of Example 1 in glacial acetic acid (70 ml.) was added slowly (3 hr.) to a stirred solution of acetic anhydride (50 ml., 0.53 mole) in glacial acetic acid (50 ml.) heated at reflux. After the addition was completed, the mixture was heated for 30 min. longer. Water (20 ml.) was added and the acetic acid was removed by distillation under vacuum. Vacuum distillation of the residue gave yields of 30–60% of cis-$d,l$-pinolic acid acetate, in a series of similar runs, the yield generally being less than 40%. The physical and chemical characteristics of the cis-$d,l$-pinolic acid acetate are given below in Table I.

EXAMPLE 3

Pinolic acid propionate and pinolic acid butyrate were prepared by the procedure of Example 2, using the appropriate anhydride and the corresponding alkyl monocarboxylic acid in each case. The yields of these two products were generally not as good as the yields of the product of Example 2. The physical and chemical characteristics of pinolic acid propionate and pinolic acid butyrate are given below in Table I.

EXAMPLE 4

*Cis-d,l-pinolic acid acetate, by catalytic method.*—A solution of cis-$d,l$-pinolic acid (186 g., 1 mole) in 400 ml. of chloroform, and a solution consisting of 240 ml. glacial acetic acid, 20 g. p-toluenesulfonic acid in 200 ml. of chloroform were dried by azeotropic distillation of water with return of chloroform to the solution. The pinolic acid solution was added slowly (4 hr.) to the acetic acid-p-toluenesulfonic acid solution heated at reflux, and the water formed was removed azeotropically. After the reaction was complete, the mixture was cooled and washed with 200 ml. of water. The wash was extracted with 25–30 ml. of chloroform and the extract combined with the original chloroform solution. The combined solution was stripped under 30–35 mm. pressure to a pot temperature of about 100° C. The residue was washed to remove residual acetic acid, and then vacuum distilled bulb-to-bulb and then through a 2 x 20 cm. column packed with 6 mm. glass helices. The physical and chemical characteristics of the acylated pinolic acid product are given below in Table I.

EXAMPLE 5

Pinolic acid propionate and pinolic acid butyrate were prepared by the procedure of Example 4, using the appropriate acid in each case. The yields of these two products were 45 and 40%, respectively. Their physical and chemical characteristics are given below in Table I.

*Table I*

ACYLATED PINOLIC ACIDS

| Acylated Pinolic Acid | M.P., ° C. | B.P., ° C./mm. | Saponification Equivalent | |
|---|---|---|---|---|
| | | | Found | Calc'd |
| Pinolic acid acetate | 71–73 | 126/0.1 | 113.5 | 114 |
| Pinolic acid propionate | | 132/0.1 | 123.7 | 123 |
| Pinolic acid butyrate | | 140/0.1 | 130.5 | 130 |

EXAMPLE 6

*Vinyl pinolate (by vinyl interchange reaction).*—Cis-$d,l$-pinolic acid (1 mole) was placed in a reaction flask with 0.5 g. of copper resinate. Vinyl acetate (1110 ml., 12 moles) was distilled into the flask and cooled below 30° C. Mercuric acetate (4.0 g., 0.0126 mole) was added and dissolved by stirring the mixture. The reaction mixture was cooled to about 0° C., then sulfuric acid (0.5 ml., 0.0093 mole) was added dropwise with vigorous stirring while maintaining the mixture at about 0° C. The flask was swept with nitrogen and allowed to stand at about 0° C. for five days (the low temperature was maintained in order to avoid formation of the vinylidene compound at the hydroxyl group). Sodium acetate (2 g., 0.024 mole) was added and the mixture was stirred 30 min. The excess vinyl acetate and most of the acetic acid formed in the reaction were removed by distillation under reduced pressure. The residue was then washed with water (2 x 50 ml.) and exhaustively extracted with saturated sodium bicarbonate solution to remove any unreacted acid. After drying over anhydrous sodium sulfate, the residue was vacuum distilled to give vinyl pinolate in 62.2% yield. The physical and chemical characteristics of the vinyl pinolate are given below in Table II.

EXAMPLE 7

*Vinyl acetyl pinolate; vinyl propionyl pinolate; and vinyl butyryl pinolate.*—Pinolic acid acetate, pinolic acid propionate, and pinolic acid butyrate were each vinylated according to the procedure of Example 6, except that in these cases the reaction mixture was not cooled to 0° C. prior to the addition of the sulfuric acid, nor during and after addition of the acid; and the reaction time was shortened to three days at room temperature. The yields of vinyl acetyl pinolate, vinyl propionyl pinolate, and vinyl butyryl pinolate were 61.5, 53 and 54%, respectively. The physical and chemical characteristics of the vinyl acyl pinolates are given below in Table II.

*Table II*

VINYL PINOLATE AND VINYL ACYL PINOLATES

| Ester | B.P., ° C./mm. | $n_D^{25}$ | Hydrogenation, g./mole $H_2$ | |
|---|---|---|---|---|
| | | | Calcd. | Found |
| Vinyl pinolate | 114/3.0 | 1.4669 | 212.28 | 208 |
| Vinyl acetyl pinolate | 138/2.5 | 1.45459 | 254.34 | 249 |
| Vinyl propionyl pinolate | 145/2.0 | 1.4532 | 268.34 | 265 |
| Vinyl butyryl pinolate | 122/0.1 | 1.4597 | 282.37 | 281 |

Each of the four vinyl esters of Table II was catalytically reduced over 5% palladium on carbon in the usual manner to produce the corresponding ethyl ester. The ethyl esters obtained were found by infrared analyses to be identical with the corresponding ethyl esters of Table III in Example 8 below, produced by direct esterification of the appropriate acid.

EXAMPLE 8

Pinolic acid, pinolic acid acetate, pinolic acid propionate, and pinolic acid butyrate were each esterified with ethyl alcohol in the following manner: The acid was placed in a reaction flask with 95% ethanol (a ratio of 4 moles of acid to 17 moles of ethanol was used), a volume of chloroform or benzene equal to the volume of ethanol employed, and about 5 g. of p-toluenesulfonic acid catalyst per mole of acid to be esterified. The mixture was refluxed through a 2 x 20 cm. protruded metal packed column and the water which separated was removed through a liquid decanter. After separation of the theoretical amount of the mixture was cooled, and treated with water until no further phase separation was noted. The organic layer was washed with sodium bicarbonate solution until the wash remained basic to pH paper, and was then dried over sodium sulfate. Evaporation and distillation of the residue in the usual way yielded the pure ethyl ester. The physical and chemical characteristics of the four ethyl esters are given below in Table III.

The propyl and allyl esters of pinolic acid were prepared in similar manner. In each case, the esterification of pinolic acid was stopped as soon as the theoretical amount of water was collected since pinolic acid or its esters slowly dehydrate under the conditions of esterification. The characteristics of the propyl and allyl esters are given below in Table III.

polymer was a tough, rubbery material; after the reaction was complete, a polymer resulted which was much like the polymer prepared in Example 10.

EXAMPLE 13

*Homopolymerization of vinyl acetyl pinolate.*—Homopolymers were made from freshly distilled (under reduced pressure) vinyl acetyl pinolate according to the following procedure: 5 g. of the vinyl ester, 10 ml. of

*Table III*

ETHYL, PROPYL AND ALLYL ESTERS

| Acid | Alcohol | B.P., °C./ mm. | $n_D^{25}$ | Molecular weight | | Yield, percent |
|---|---|---|---|---|---|---|
| | | | | Calculated | Found | |
| Pinolic | Ethyl | 116–120/1.0 | 1.4534 | 214.30 | a 216 | 53.6 |
|  | Propyl | 153–154/1.0 | 1.4529 | 228.33 | a 230 | 69.2 |
|  | Allyl | 134–137/2.0 | 1.4619 | 226.31 | b 225 | 69.5 |
| Pinolic acid acetate | Ethyl | 76–78/.05 | 1.4416 | 255.32 | a 257 | 75 |
| Pinolic acid propionate | do | 98–99/0.15 | 1.4423 | 270.36 | a 268 | 65 |
| Pinolic acid butyrate | do | 110–112/0.10 | 1.4415 | 284.39 | a 283 | 67 | a Determined by saponification equivalents.
b Determined from hydrogenation (g./mole $H_2$ absorbed).

EXAMPLE 9

*Polymerization of vinyl pinolate.*—Vinyl pinolate (10.6 g., 0.05 mole) was mixed with 0.25 ml. (0.003 mole) of chloroform and 0.02 g. benzoyl peroxide and heated on a hot plate to 80° C. A very viscous colorless material having a consistency of thick rubber cement resulted. The polymer was soluble in methanol and insoluble in benzene. It contained one hydroxyl group per monomer unit.

EXAMPLE 10

*Reaction of polyvinyl pinolate with toluene diisocyanate.*—The polyvinyl pinolate polymer of Example 9, was mixed with 0.90 ml. of toluene diisocyanate by means of a stirring rod. The material almost immediately set to a rubbery, insoluble solid polymer. The physical appearances and strength of this reaction product was about that of art gum.

water, 0.5 g. of Triton X–301 (a commercial sodium alkyl aryl polyether sulfate), 2 ml. of a 2.5% by weight aqueous solution of potassium persulfate, and a dry of Hooker's lauryl mercaptan were charged into a 2-oz. polymerization bottle. The bottle was flushed with nitrogen, sealed with a cap containing a rubber gasket, and then tumbled end-over-end in a 50° C. constant temperature bath for the period of time indicated below in Table IV. Any minor variations in the recipe are noted in Table IV. The resulting polymer latex was coagulated in the usual way with sodium chloride-sulfuric acid-water coagulant solution. The coagulated polymer was then dissolved in benzene and precipitated by pouring the solution into methanol. The polymer was separated and freeze-dried under vacuum to give the final homopolymer product. The results of a number of homopolymerization experiments are given in Table IV.

*Table IV*

HOMOPOLYMERIZATION OF VINYL ACETYL PINOLATE

| Monomer | Experiment No. | Polymerization time, hrs. | Conversion, percent | Capillary Softening Range, °C. | Inherent Viscosity a | Minor Variations in Recipe |
|---|---|---|---|---|---|---|
| Vinyl acetyl pinolate | 1 | 24 | 90 | 85–98 | 0.14 | |
| Do | b 2 | 48 | 60 | 75–98 | 0.18 | 1 ml. of 2.5% $K_2S_2O_8$ solution. |
| Do | 3 | 24 | 80 | 85–100 | 0.24 | |
| Do | 4 | 48 | 70 | 80–95 | 0.44 | | a 0.25 g. homopolymer per 100 ml. benzene solvent at 25° C.
b Homopolymer—anal. cac'd. for $C_{14}H_{22}O_4$: C, 66.11; H, 8.72. Found: C, 65.72; H, 9.19.

EXAMPLE 11

*Homopolymerization of vinyl pinolate.*—Vinyl pinolate (30 g.) was dissolved in 45 ml. ethyl acetate. To this mixture, 0.15 g. benzoyl peroxide was added. After heating several hours, the clear polymer solution was added to 1 liter benzene. A colorless, insoluble viscous polymer separated. The precipitate was dissolved in methanol, transferred to a vacuum system, and the solvent was removed. The residue, 8 g., was a hard, brittle polymer.

EXAMPLE 12

*Reaction of polyvinyl pinolate with toluene diisocyanate.*—Reaction of 2 g. of the homopolymer of Example 11 with 0.5 g. of toluene diisocyanate gave an insoluble polymer. During the interim of its preparation, the All of the homopolymers had low softening points and were inclined to be slightly sticky. Larger and smaller molecular weight materials can be obtained as noted in the table.

EXAMPLE 14

*Homopolymerization of vinyl butyryl pinolate.*—Benzoyl peroxide, 10 mg., was added to 5 cc. vinyl butyryl pinolate in a stoppered test tube. This was heated on a steam bath. When it became hot, the material polymerized with almost explosive violence. The solution changed from a fluid liquid to a viscous liquid in 2 minutes. The polymer product was clear, colorless, and soluble in benzene, methanol, butanol, and insoluble in hydrocarbon solvents like pentane and hexane.

EXAMPLE 15

*Copolymerization of vinyl acetyl pinolate with vinyl chloride.*—Vinyl acetyl pinolate was found to copolymerize readily with vinyl chloride top roduce copolymers of a variety of compositions. The general procedure used for making the copolymers was as follows: A polymerization bottle was charged with the desired weight of vinyl acetyl pinolate monomer, water (20 ml.), Triton X–301 (a commercial sodium alkyl aryl polyether sulfate (2.5 g.), potassium persulfate solution (2 ml. of 2.5% solution) and a drop of Hoker's lauryl mercaptan. The bottle was flushed out with nitrogen and cooled in a Dry Ice-acetone bath. Then an excess of liquid vinyl chloride was added and the bottle allowed to warm up so vinyl chloride distilled out of the bottle until the desired weight remained. The bottle was then tightly capped and after it had warmed up to room temperature was placed in a 45° C. bath and tumbled end-over-end for the time noted in Table V below. The bottles were then removed, cooled, and opened. The latex was coagulated with salt-sulfuric acid solution. The polymer was collected, washed well with water, methanol and ether, and then dissolved in tetrahydrofuran to give about a 10% solution. This solution was then poured into excess methanol which was stirred in a mechanical blender. The polymer was collected on a filter, washed with methanol, and dried for two days under reduced pressure. When polymer samples were prepared for evaluation of their mechanical characteristics, several bottles were charged and polymerized at one time and the contents combined and worked up together. The results of a number of copolymerization experiments are given in Table V.

Equal parts by weight of the copolymers from Experiments 4 and 5 (Table V) were blended and tested for mechanical characteristics, using standard test procedures. ASTM test 638–52T were employed to determine all characterisitcs except the torsional flex temperature ($Tf$) which was determined by ASTM test D1043–51. The following test data were obtained for the copolymer: milling temperature, 270° C.; molding temperature, 280° C.; yield point, 7,830 p.s.i.; modulus of elasticity, 190,000; tensile strength at break (original cross section), 5,280 p.s.i.; tensile strength at break (cross section at break), 9,070 p.s.i.; elongation, 111%; $Tf$, +60° C.

We claim:

1. A vinyl acyl pinolate selected from the group consisting of vinyl acetyl pinolate, vinyl propionyl pinolate, and vinyl butyryl pinolate.
2. Vinyl acetyl pinolate.
3. Vinyl propionyl pinolate.
4. Vinyl butyryl pinolate.
5. A homopolymer of a vinyl acyl pinolate selected from the group consisting of vinyl acetyl pinolate, vinyl propionyl pinolate, and vinyl butyryl pinolate.
6. A homopolymer of vinyl acetyl pinolate.
7. A homopolymer of vinyl propionyl pinolate.
8. A homopolymer of vinyl butyryl pinolate.
9. A copolymer of vinyl chloride and a vinyl acyl pinolate selected from the group consisting of vinyl acetyl pinolate, vinyl propionyl pinolate, and vinyl butyryl pinolate.
10. A copolymer of vinyl chloride and vinyl acetyl pinolate.
11. A copolymer of vinyl chloride and vinyl propionyl pinolate.
12. A copolymer of vinyl chloride and vinyl butyryl pinolate.

*Table V*
COPOLYMERIZATION OF VINYL ACETYL PINOLATE WITH VINYL CHLORIDE

| Experiment No. | | Vinyl Chloride | | Polymerization time, hrs. | Conversion, percent | Softening range, °C. | Inherent viscosity [a] | Chlorine content, percent | Ester Incorporation, percent |
|---|---|---|---|---|---|---|---|---|---|
| | | g. | g. | | | | | | |
| 1 | Vinyl acetyl pinolate | 2 | 18 | 88 | 39 | 125–170 | 0.80 | 53.13 | 7.0 |
| 2 | do | 4 | 16 | 88 | 66 | 125–165 | 0.78 | 47.84 | 15.8 |
| 3 | do | 4 | 16 | 88 | 61 | 125–154 | 0.74 | 49.63 | 12.5 |
| 4 | do | 6 | 14 | 88 | 74 | 118–145 | 0.67 | 42.35 | 25.4 |
| 5 | do | 6 | 14 | 88 | 87.5 | 125–151 | 0.61 | 42.76 | 24.6 |
| 6 | do | 7.5 | 12.5 | 48 | 88 | 132–143 | 0.66 | 37.07 | [b] 34.9 |
| | | | | | | | 0.58 | 37.16 | [c] 34.5 |

[a] Measured at a concentration of 0.25 g. of polymer in 100 ml. of tetrahydrofuran at 25° C.
[b] This fraction separated as a light powder.
[c] This fraction separated as a lumpy solid.

References Cited in the file of this patent

UNITED STATES PATENTS

| 2,448,246 | Barker | Aug. 31, 1948 |
| 3,030,337 | Hedrick | Apr. 17 1962 |

OTHER REFERENCES

Lewis and Hedrich: "Preparation of Some Vinyl Alkyl Pinates," reprint from Journal of Organic Chemistry, volume 25, page 623 et seq. (1960).
Beilstein X–12, #11, 1949.
Chemical Abstracts, volume 50, 4850h et seq., 1956.